(12) United States Patent
 Firka et al.

(10) Patent No.: US 11,460,746 B2
(45) Date of Patent: Oct. 4, 2022

(54) ELECTRONIC DEVICES HAVING ELECTRICALLY ADJUSTABLE OPTICAL SHUTTERS

(71) Applicant: Apple Inc., Cupertino, CA (US)

(72) Inventors: Michael W. Firka, Santa Clara, CA (US); Ashley E. Fletcher, San Francisco, CA (US); Benjamin J. Pope, Woodside, CA (US); Lee E. Hooton, Massapequa, NY (US); Scott A. Myers, Saratoga, CA (US); Benjamin Shane Bustle, Cupertino, CA (US); Garam Young, Sunnyvale, CA (US); Blake M. Coughenour, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/119,878

(22) Filed: Dec. 11, 2020

(65) Prior Publication Data
US 2021/0096417 A1   Apr. 1, 2021

Related U.S. Application Data

(63) Continuation of application No. 16/808,911, filed on Mar. 4, 2020, now Pat. No. 10,942,412, which is a (Continued)

(51) Int. Cl.
*G02F 1/137* (2006.01)
*G02B 26/00* (2006.01)
(Continued)

(52) U.S. Cl.
CPC ....... *G02F 1/13781* (2013.01); *G02B 26/005* (2013.01); *G02F 1/13306* (2013.01);
(Continued)

(58) Field of Classification Search
None
See application file for complete search history.

(56) References Cited

U.S. PATENT DOCUMENTS 5,825,447 A   10/1998 Hanyu et al.
6,481,851 B1   11/2002 McNelley et al.
(Continued)

OTHER PUBLICATIONS

Xeetechcare, iPhone 6 (White)—Unboxing HD, Youtube, Sep. 2014, https://www.youtube.com/watch? v=FD8cKqUsvR8.

*Primary Examiner* — Nicholas J Lee
(74) *Attorney, Agent, or Firm* — Treyz Law Group, P.C.; G. Victor Treyz; David K. Cole

(57) ABSTRACT

An electronic device has an electrically adjustable shutter. The shutter may be placed in a transparent state or a nontransparent state. The shutter may overlap a portion of a display, may overlap a liquid contact indictor or a structure with text in a device, or may overlap an optical component such as an optical proximity sensor, ambient light sensor, visible light-emitting diode or laser, infrared light-emitting diode or laser, visible light image sensor, or infrared light image sensor. Control circuitry in the electronic device may place the shutter in an opaque state to hide an overlapped component from view or may place the shutter in a transparent state to allow the overlapped component to transmit or receive light. The adjustable shutter may exhibit changes in its transmission spectrum in different modes of operation and may be used as a camera filter or neutral density filter.

20 Claims, 10 Drawing Sheets

Related U.S. Application Data continuation of application No. 15/887,661, filed on Feb. 2, 2018, now Pat. No. 10,690,986.

(60) Provisional application No. 62/558,110, filed on Sep. 13, 2017.

(51) Int. Cl.
*G09G 3/36* (2006.01)
*G09G 3/34* (2006.01)
*G02F 1/133* (2006.01)

(52) U.S. Cl.
CPC ............... *G09G 3/348* (2013.01); *G09G 3/36* (2013.01); *G09G 2300/023* (2013.01); *G09G 2360/144* (2013.01)

(56) References Cited

U.S. PATENT DOCUMENTS

| | | |
|---|---|---|
| 6,565,727 B1 | 5/2003 | Shenderov |
| 6,900,458 B2 | 5/2005 | Tung et al. |
| 8,867,015 B2 | 10/2014 | Posner et al. |
| 9,081,541 B2 | 7/2015 | Jung |
| 2004/0150584 A1 | 8/2004 | Chuman et al. |
| 2006/0097991 A1 | 5/2006 | Hotelling et al. |
| 2007/0013624 A1 | 1/2007 | Bourhill |
| 2008/0080850 A1 | 4/2008 | Amirzadeh et al. |
| 2008/0192013 A1 | 8/2008 | Barrus et al. |
| 2008/0304819 A1 | 12/2008 | Tolbert |
| 2009/0002806 A1 | 1/2009 | Skipor et al. |
| 2009/0005011 A1 | 1/2009 | Christie et al. |
| 2009/0027306 A1 | 1/2009 | Kawabe |
| 2009/0141334 A1 | 6/2009 | Dean et al. |
| 2010/0265562 A1* | 10/2010 | Reynolds ............... G02F 1/155 359/275 |
| 2011/0221656 A1 | 9/2011 | Haddick et al. |
| 2011/0268151 A1 | 11/2011 | Hadwen et al. |
| 2012/0105487 A1 | 5/2012 | Son et al. |
| 2012/0206503 A1 | 8/2012 | Hirakata et al. |
| 2013/0094126 A1* | 4/2013 | Rappoport ........... G09G 3/3208 361/679.01 |
| 2013/0128336 A1 | 5/2013 | Dean et al. |
| 2013/0188366 A1 | 7/2013 | Russell-Clarke et al. |
| 2013/0194167 A1 | 8/2013 | Yun et al. |
| 2013/0250396 A1 | 9/2013 | Kim et al. |
| 2013/0271378 A1* | 10/2013 | Hulford .................. G09G 3/20 345/168 |
| 2013/0271445 A1 | 10/2013 | Park et al. |
| 2014/0033119 A1 | 1/2014 | Kim et al. |
| 2014/0063049 A1 | 3/2014 | Armstrong-Muntner |
| 2014/0139637 A1 | 5/2014 | Mistry et al. |
| 2014/0219646 A1 | 8/2014 | Hooton et al. |
| 2014/0247543 A1 | 9/2014 | Ozolins et al. |
| 2014/0293188 A1 | 10/2014 | Chen et al. |
| 2015/0067602 A1 | 3/2015 | Bernstein et al. |
| 2015/0163382 A1 | 6/2015 | Kwong et al. |
| 2015/0228217 A1* | 8/2015 | Perdices-Gonzalez ...................... G09G 3/2092 345/5 |
| 2016/0196785 A1 | 7/2016 | Amesz |
| 2016/0328023 A1 | 11/2016 | Mistry et al. |
| 2016/0370574 A1 | 12/2016 | Cho et al. |
| 2017/0134623 A1* | 5/2017 | Lee ................. H04N 5/232122 |
| 2019/0079334 A1 | 3/2019 | Firka et al. |

* cited by examiner

ELECTRONIC DEVICES HAVING ELECTRICALLY ADJUSTABLE OPTICAL SHUTTERS

This application is a continuation of U.S. patent application Ser. No. 16/808,911, filed Mar. 4, 2020, which is a continuation of U.S. patent application Ser. No. 15/887,661, filed Feb. 2, 2018, now U.S. Pat. No. 10,690,986, which claims the benefit of provisional patent application No. 62/558,110, filed Sep. 13, 2017, which are hereby incorporated by reference herein in their entireties.

FIELD

This relates generally to electronic devices, and, more particularly, to electronic devices with electrically adjustable optical shutters.

BACKGROUND

Electronic devices such as laptop computers, cellular telephones, and other equipment are sometimes provided with optical components. The optical components may include components such as an image sensor (camera), a camera flash, an optical proximity sensor, or an ambient light sensor. Components such as these generally operate through windows in device housings or portions of a display. Although optical coating structures can sometimes be provided on windows to help blend their visual appearance with surrounding structures, it is often difficult or impossible to effectively hide an optical component behind a window. As a result, conventional electronic devices often have windows that are not as visually appealing ad desired.

SUMMARY

An electronic device may be provided with optical components and other components. The optical components may include an optical proximity sensor, ambient light sensor, visible light-emitting diode, visible laser, infrared light-emitting diode, infrared laser, visible light image sensor, or infrared light image sensor. An optical component window may be aligned with one or more optical component windows.

An electrically adjustable shutter may be provided. The shutter may be aligned with an optical component window or may be mounted in other portions of an electronic device. In some configurations, the shutter may overlap a portion of a display such as a transparent display. In other configurations, the shutter may overlap a liquid contact indictor, an optical data port, or a region with text.

The shutter may be dynamically adjusted by control circuitry in the device to adjust the optical properties of the shutter. For example, the shutter may be placed in a transparent state or a state in which the shutter is not transparent. During operation, control circuitry in the electronic device may place the shutter in an opaque state to hide an overlapped component from view or may place the shutter in a transparent state to allow the overlapped component to transmit or receive light. The adjustable shutter may exhibit changes in its transmission spectrum in different modes of operation and may be used as a spectral filter or neutral density filter for a camera or other optical component.

DETAILED DESCRIPTION

Electronic devices may be provided with electrically adjustable optical shutters. The electrically adjustable shutters may be used to adjust the outward appearance of one or more portions of an electronic device. For example, an electrically adjustable shutter may be overlap a component or structure in the interior of an electronic device. The state of the electrically adjustable shutter may be dynamically adjusted to allow light to pass or to provide the adjustable shutter with an opaque appearance or other desired appearance. In some configurations, the electrically adjustable shutter may be placed in a dark state or other non-transparent state to hide an overlapped optical component or other device structure from view while visually blending the appearance of the adjustable shutter with surrounding device housing structures.

Figure 1:
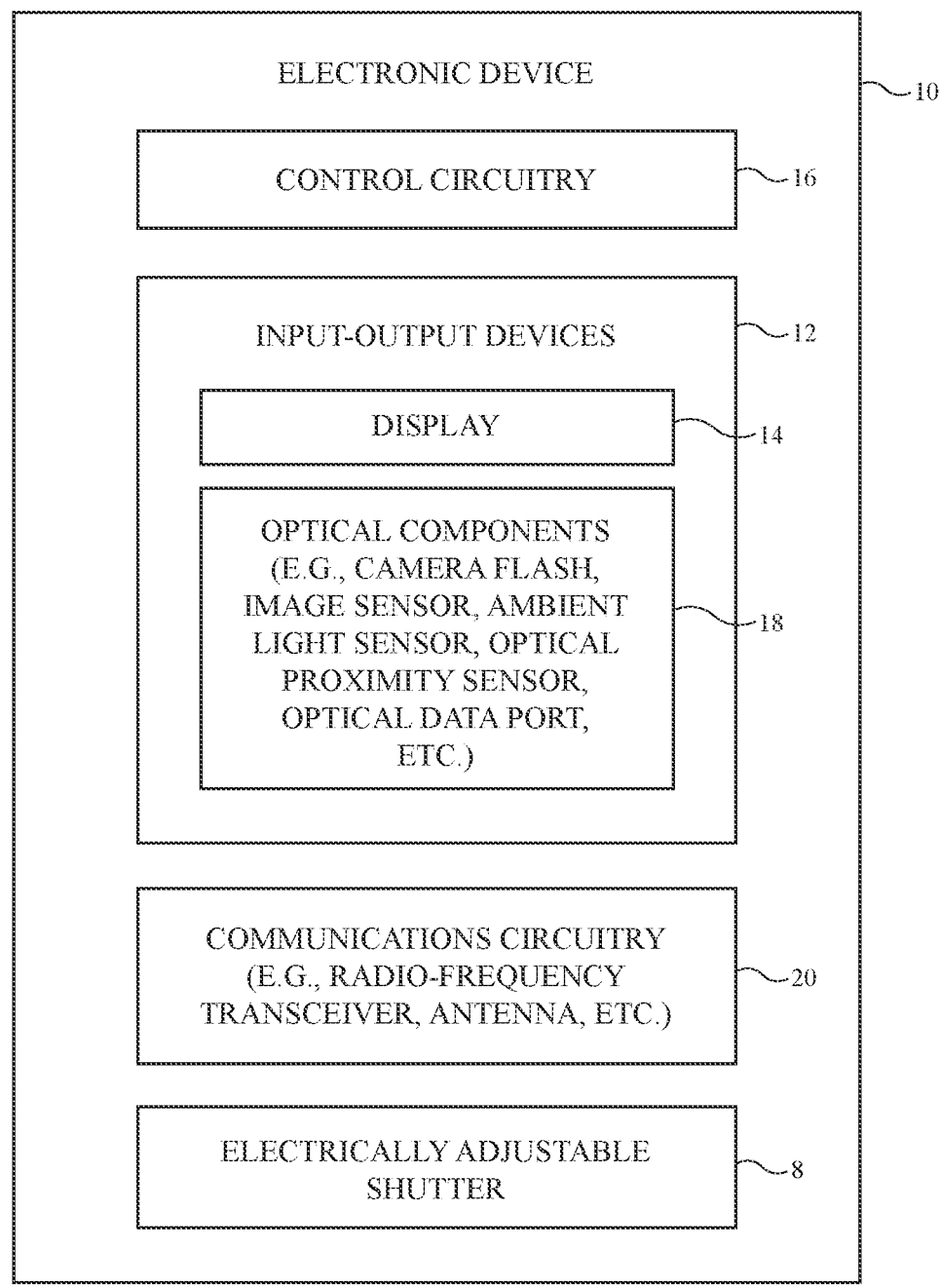
FIG. 1 is a schematic diagram of an illustrative electronic device with an adjustable optical shutter in accordance with an embodiment.

An illustrative electronic device of the type that may be provided with an electrically adjustable shutter is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Device 10 may have input-output circuitry such as input-output devices 12. Input-output devices 12 may include user input devices that gather user input and output components that provide a user with output. Devices 12 may also include sensors that gather information from the environment. Communications circuitry 20 may be used to receive data for device 10 and may be used to supply data from device 10 to external devices. Communications circuitry 20 may include one or more antennas an associated radio-frequency transceiver circuitry. The transceiver circuitry may include wireless local area network transceiver circuitry, cellular telephone transceiver circuitry, and/or other radio-frequency transceiver circuitry and may operate in any suitable frequency band (e.g., a frequency of 700-2700 MHz, 2.4-5 GHz, less than 700 MHz, more than 2700 GHz, etc.).

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be a liquid crystal display, a light-emitting diode display (e.g., an organic light-emitting diode display), an electrophoretic display, or other display.

Input-output devices 12 may include optical components 18. Optical components 18 may include ambient light sensors (e.g., color ambient light sensors configured to measure ambient light color and intensity by making light measurements with multiple light detector channels each of which has a corresponding color filter and photodetector to measure light in a different wavelength band), optical proximity sensors (e.g., sensors with a light-emitting device such as an infrared light-emitting diode and a corresponding light detector such as an infrared photodiode for detecting when an external object that is illuminated by infrared light from the light-emitting diode is in the vicinity of device 10), a visible light camera (visible light digital image sensor), an infrared light camera (infrared digital image sensor), light-emitting diodes and/or laser diodes that emit flash illumination for visible light cameras (sometimes referred to as camera flash), infrared light-emitting diodes that emit illumination for infrared cameras, light-emitting diodes and/or lasers and sensors that support optical communications in an optical data port, and/or other optical components.

In addition to optical components 18, input-output devices 12 may include buttons, joysticks, scrolling wheels, touch pads, key pads, keyboards, microphones, speakers, tone generators, vibrators, cameras, lasers, light-emitting diodes and other status indicators, non-optical sensors (e.g., temperature sensors, microphones, capacitive touch sensors, force sensors, gas sensors, pressure sensors, sensors that monitor device orientation and motion such as inertial measurement units formed from accelerometers, compasses, and/or gyroscopes), data ports, etc. A user can control the operation of device 10 by supplying commands through input-output devices 12 and may receive status information and other output from device 10 using the output resources of input-output devices 12.

Device 10 may have one or more electrically adjustable shutters such as electrically adjustable shutter 8. Shutter 8 may be adjusted to operate in different light transmission modes. For example, in different modes of operation, shutter 8 may exhibit different light transmission values (e.g., a high transmission value of at least 80% or at least 90% and a low transmission value of less than 40%, less than 20%, or less than 10%), different colors (e.g., non-neutral colors such as blue, red, green, blue-black, etc.), different neutral colors (white, black, gray, etc.), different reflectivities (e.g., a low reflectivity of less than 40%, less than 20%, or less than 10% or a high reflectively of more than 60%, more than 80%, or more than 90%), different light absorption values (and/or different light absorption spectral shapes), different amounts of haze, and/or other properties that vary the appearance and/or light transmission, absorption, and/or reflection of shutter 8. Electrically adjustable shutter 8 may be formed from a liquid crystal device, an electrochromic device, a suspended particle device, an electrophoretic device, an electrowetting device, and/or other adjustable devices that exhibit adjustable optical properties such as haze, light reflection, light absorption, and/or light transmission.

Figure 2:
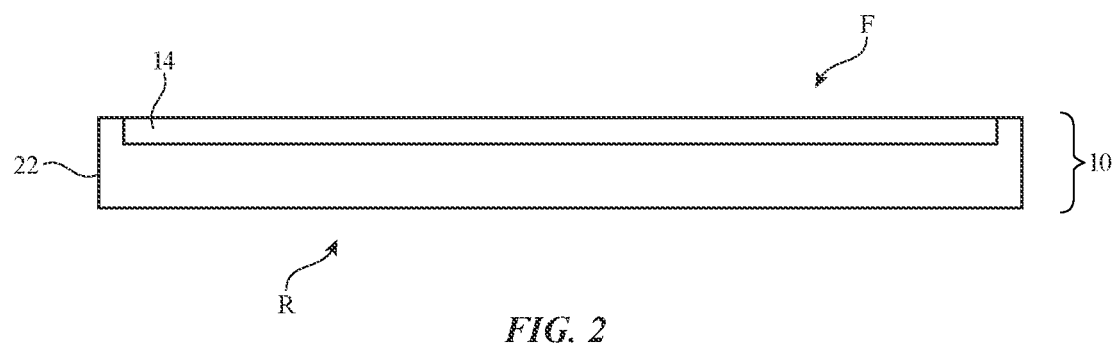
FIG. 2 is a side view of an illustrative electronic device in accordance with an embodiment.

Device 10 may have a housing. The housing may form a laptop computer enclosure, an enclosure for a wristwatch, a cellular telephone enclosure, a tablet computer enclosure, or other suitable device enclosure. A side view of an illustrative electronic device is shown in FIG. 2. The illustrative device of FIG. 2 has a planar configuration (e.g., for a portion of a laptop computer, a tablet computer, a cellular telephone, etc.). This arrangement is presented as an example. In general, housing 22 of device 10 may have any suitable configuration.

In the example of FIG. 2, device 10 has opposing front and rear faces (front face F and rear face R). Display 14 may be mounted in housing 22 on front face F of device 10. Portions of housing 22 (e.g., a planar rear housing wall) may be formed on rear face R of device 10. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer (e.g., a transparent planar member that forms some or all of a front face of device 10 or that is mounted in other portions of device 10). Openings may be formed in the display cover layer. For example, an opening may be formed in the display cover layer to accommodate a button, a speaker port, or other components. Openings may be formed in housing 22 to form communications ports (e.g., an audio jack port, a digital data port, an optical port, etc.), to form openings for buttons, etc. In some configurations, housing 22 may have a rear housing wall formed from a planar glass member or other transparent layer (e.g., a planar member formed on rear face R of device 10 opposing a display cover layer formed on front face F of device 10). In some configurations, a transparent planar member forming the rear housing wall may have an interior surface that is coated with an opaque masking layer. Window structures (e.g., for cameras, camera flash, and other optical components) may be formed in display 14 (e.g., in a display cover layer), in housing 22 (e.g., in a rear housing wall or a planar or curved housing sidewall), and/or in other portions of device 10.

Figure 3:
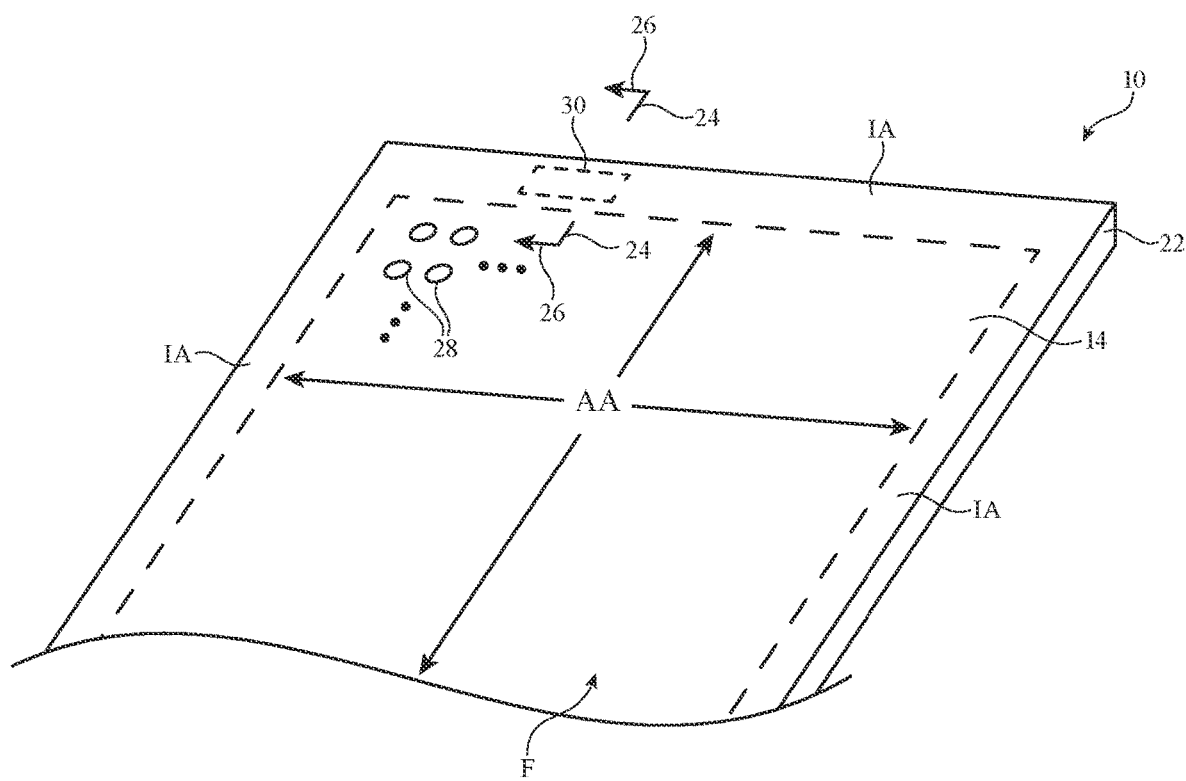
FIG. 3 is a front perspective view of an illustrative electronic device in accordance with an embodiment.

FIG. 3 is a front perspective view of the illustrative electronic device of FIG. 2. As shown in FIG. 3, display 14 may be mounted in housing 22 on front face F of device 10. Display 14 may have an array of pixels 28 in active area AA (e.g., liquid crystal display pixels, organic light-emitting diode pixels, electrophoretic display pixels, etc.). Pixels 28 of active area AA may display images for a user of device 10. Active area AA may be rectangular or may have other suitable shapes.

Inactive portions of display 14 such as inactive border area IA may be formed along one or more edges of active area AA. Inactive border area IA may overlap circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink (e.g., polymer containing black dye and/or black pigment, opaque materials of other colors, etc.) and/or other layers (e.g., metal, dielectric, semiconductor, etc.). Opaque masking materials such as these may also be formed on an inner surface of a planar rear housing wall formed from glass, ceramic, polymer, crystalline transparent materials such as sapphire, or other transparent material.

Optical components 18 may be mounted under one or more windows such as optical component window 30 of FIG. 3. Optical components 18 under window 30 may include a visible image sensor, an infrared image sensor, an optical proximity sensor, an ambient light sensor, and one or more visible and/or infrared light-emitting diodes and/or visible and/or infrared laser diodes. Light sources such as light-emitting diodes and/or lasers (e.g., vertical cavity surface emitting lasers and/or other lasers) in components 18 may produce image sensor illumination such as visible camera flash illumination and/or infrared sensor illumination and/or may produce status indicator illumination.

In an arrangement of the type shown in FIG. 3, one or more openings for one or more respective optical component windows such as optical component window 30 may be formed in the opaque masking layer of inactive area IA. In some configurations, optical component windows 30 are free of coating layers. In other configurations, a partially transparent layer (e.g., a layer of polymer containing dye and/or pigment such as a layer of black ink) or other structures may overlap the openings to adjust the appearance of the optical component windows (e.g., to adjust the appearance of the optical component windows so that the optical component windows have appearances that match the surrounding opaque masking layer). Electrically adjustable shutters may be incorporated into windows 30. This allows windows 30 to be matched in appearance with surrounding housing structures or to have other desired appearances when it is not necessary to allow light to pass through window 30 and allows windows 30 to be rendered transparent during use of optical component 18 or other structures overlapped by windows 30.

Optical component windows may, in general, include any suitable layer(s) of material (e.g., inorganic and/or organic thin-film layers, partially transparent metal films, dielectric coating layers such as thin-film interference filter coatings formed from stacks of dielectric layers, etc.). These layers of material may be formed within an opening in a layer of opaque masking material (e.g., on the underside of a display cover layer or housing layer) and/or may be formed on the surface of one or more separate transparent window members for windows 30.

In the example of FIG. 3, optical component window 30 is formed in inactive area IA of display 14 (e.g., an inactive border area in a display cover layer). If desired, optical component windows such as window 30 may be formed in other portions of device 10 such as portions of a rear housing wall formed from a transparent member coated with opaque masking material.

Figure 4:
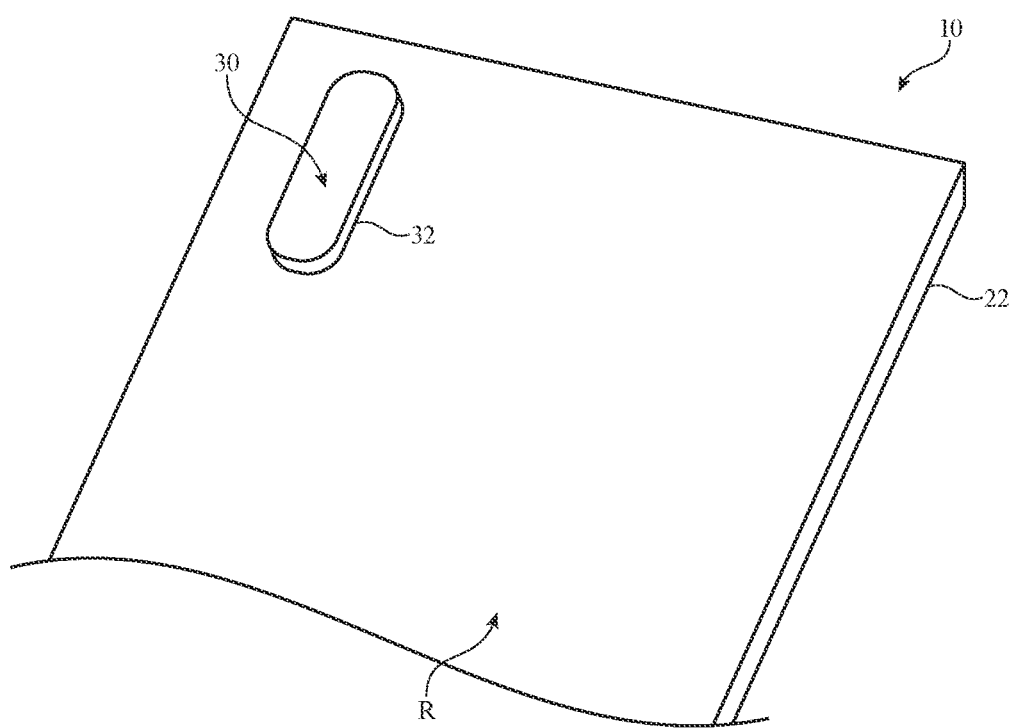
FIG. 4 is a rear perspective view of an illustrative electronic device in accordance with an embodiment.

FIG. 4 is a rear perspective view of an illustrative electronic device such as device 10 of FIG. 3. As shown in FIG. 4, an optical component window such as window 30 may, if desired, be formed from a transparent member mounted in an opening in a rear housing wall formed on rear face R of housing 22. Window 30 may, for example, include a transparent member in a raised window mount (e.g., a support structure such as bezel 32) or other inset region within the rear housing wall. In this type of configuration, the transparent material forming window 30 may be the same as the material forming the rear wall of housing 22 and/or may include different materials (e.g., transparent plastic, clear glass, transparent crystalline material such as sapphire, transparent ceramic, etc.). Window 30 may overlap a light source (e.g., a visible light-emitting diode or laser that serves as a camera flash) and a visible light digital image sensor (e.g., a visible light camera) and/or other optical components 18.

Figure 5:
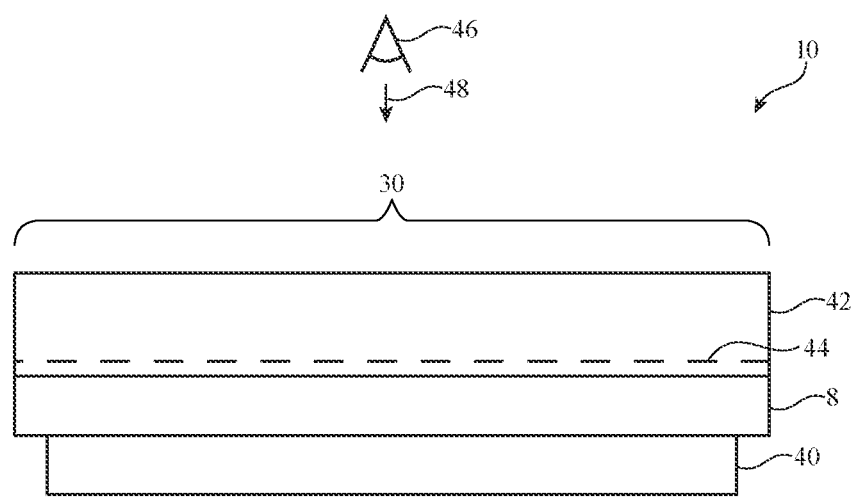
FIG. 5 is a side view of an illustrative adjustable optical shutter overlapping a component to be hidden from view such as an optical component or other structure to be selectively hidden in accordance with an embodiment.

Electrically adjustable shutter 8 may overlap optical components 18 and/or other structures within the interior of device 10, as illustrated by the overlap of shutter 8 and component 40 of FIG. 5. Window 30 in FIG. 5 may have transparent layer 42 (e.g., a portion of a display cover layer overlapping display 14 of FIG. 3, a rear housing wall in housing 22 on rear face R of device 10, a transparent window member surrounded by a support structure such as structure 32 of FIG. 4, and/or other transparent window member. Optional coating layer 44 (e.g., a partially transparent ink layer, a clear antireflection layer, an ultraviolet light blocking layer, an infrared-light-blocking layer, and/or other layer(s) may be formed in window 30 (e.g., on the underside of layer 42, etc.). Component 40 may include one or more of optical components 18 or other component or structures to be selectively hidden under shutter 8. These components and structures may include, for example, agency text and other text (logos, manufacturing country of origin, regulatory compliance notices, model numbers, serial numbers, etc.), may include water dots and other moisture exposure indicator structures, may include internal components for which viewing is sometimes desired (e.g., internal components such as integrated circuits, printed circuits, sensors, or other circuitry for which viewing may be desired for inspection or repair), may include a display such as display 14 (e.g., an array of pixels 28 in a transparent display or other display), or may include other components or structures.

When it is desired to hide component 40 from view by a user such as user 46 who is viewing device 10 in direction 48 from the exterior of device 10, shutter 8 may be placed in a non-transparent state (e.g., an opaque state, a state with high haze, etc.). When it is desired to allow light to pass through shutter 8, shutter 8 may be placed in a different state such as a high transparency (clear) state. Shutter 8 may also be adjusted to serve as an optical filter (e.g., an adjustable spectral filter that exhibits one or more desired visible light and/or infrared light absorption spectra so that shutter 8 serves as a color filter, an infrared light-blocking filter, and/or other optical filters) or to serve as a reflective element (e.g., a full or partial mirror). If desired, shutter 8 may overlap a component (e.g., a light-emitting diode or laser that serves as a camera flash) without overlapping an adjacent component under window 30 (e.g., an adjacent visible light digital image sensor). Configurations in which shutter 8 overlaps multiple optical components 18 under a common window 30 or other portion of device 10 may also be used.

Figure 6:
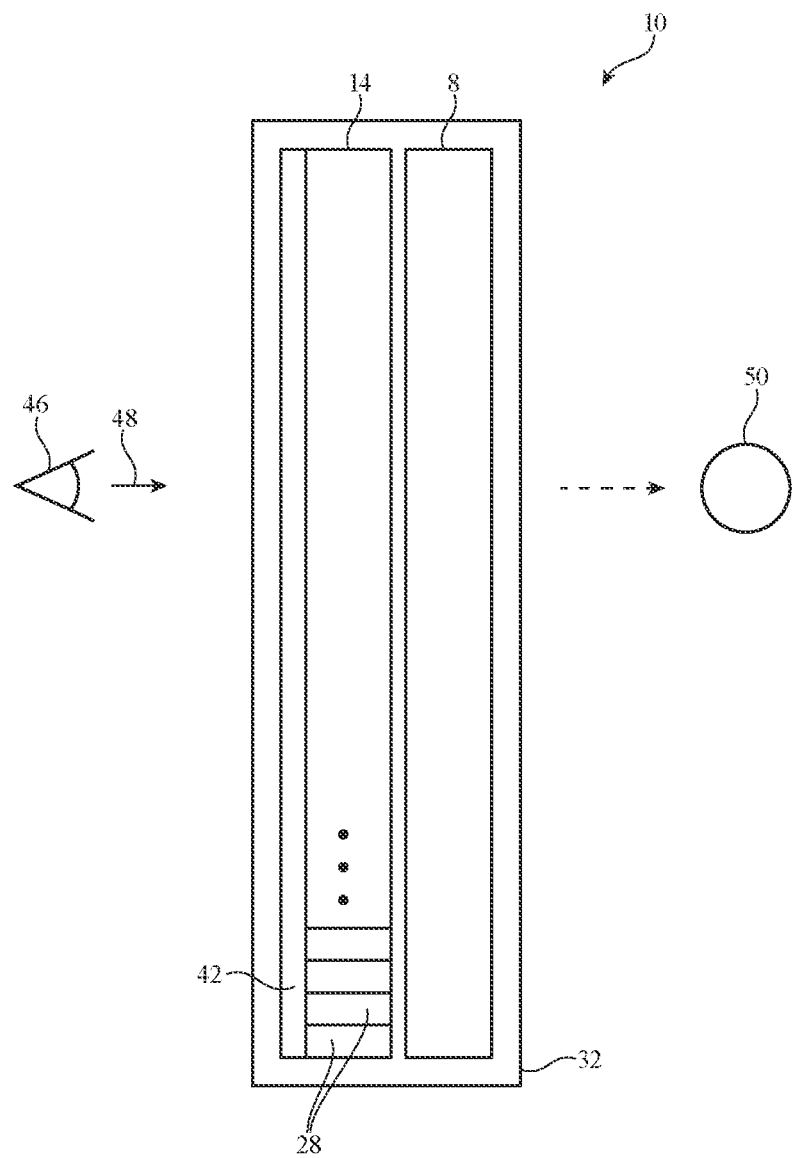
FIG. 6 is a side view of an illustrative electronic device with a transparent display and adjustable optical shutter in accordance with an embodiment.

FIG. 6 shows how display 14 may be transparent and may be interposed between viewer 46 and shutter 8 (e.g., so that array of pixels 28 for display 14 is interposed between the display cover layer for display 14 such as layer 42 and shutter 8). In this type of configuration, optical windows may be formed on both the front F and rear R of device 10. When user 46 desires to view object 50 through display 14 and shutter 8 (e.g., in a mixed reality application in which display 14 is displaying content that is overlaid on real-world objects), shutter 8 may be placed in a transparent state. When user desires to view images on display 14 without viewing object 50, shutter 8 may be placed in an opaque state. Shutters such as shutter 8 of FIGS. 5 and 6 may also be configured to overlap the front of all or part of display 14 (e.g., so that shutter 8 is interposed between display 14 and user 46 and so that shutter 8 is interposed between the display cover layer for display 14 and the pixel array for display 14 as shown by shutter 8 and illustrative component 40 of FIG. 5).

Figure 7:
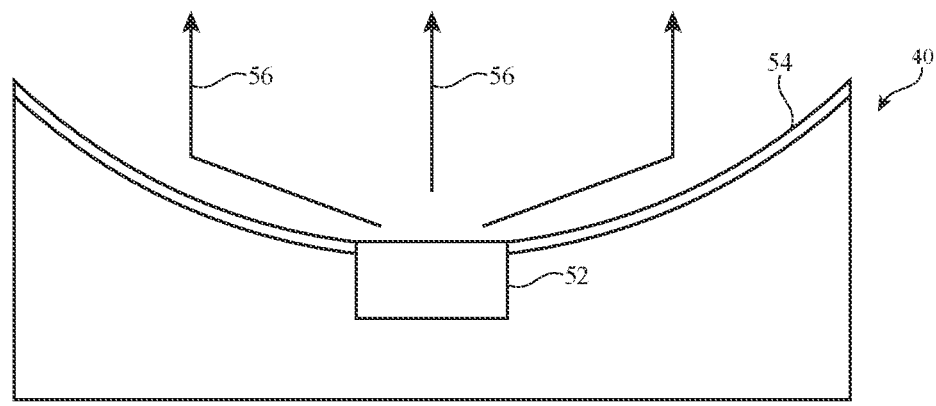
FIG. 7 is a cross-sectional side view of an illustrative light source and associated reflector in accordance with an embodiment.

In the example of FIG. 7, component 40 is an optical component such as a light source (e.g., a packaged light-emitting diode or laser). Light 56 is emitted by a light-emitting diode die and/or laser die such as die 52 and is collimated by curved reflector 54.

Figure 8:
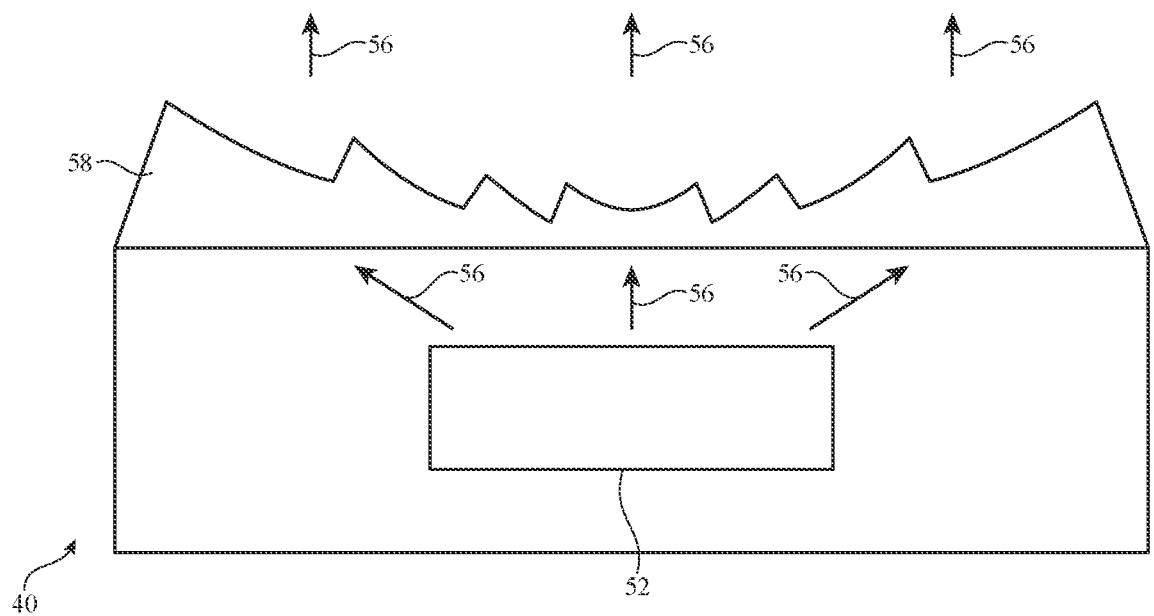
FIG. 8 is a cross-sectional side view of an illustrative light source and associated Fresnel lens in accordance with an embodiment.

FIG. 8 shows how component 40 may be a packaged light-emitting diode and/or laser having a Fresnel lens structure 58 that collimates light 56 that is emitted by die 52. Structures such as the light source structures of FIGS. 7 and 8 may be used for illuminating images for visible and infrared image sensors, may be used as a flashlight, may be used to generate visible alerts (e.g., by flashing to serve as a notification of an incoming message, etc.).

Figure 9:
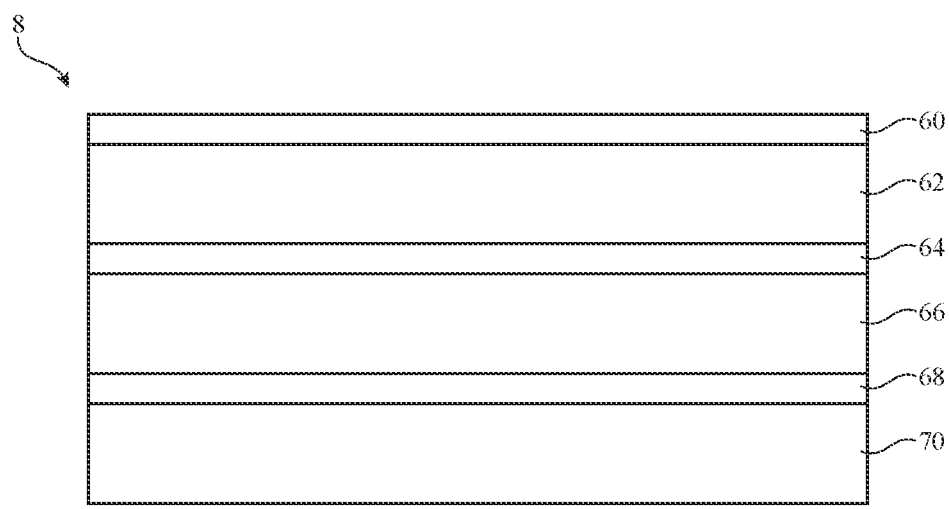
FIG. 9 is a side view of an illustrative adjustable liquid crystal shutter in accordance with an embodiment.

FIG. 9 is a cross-sectional side view of an illustrative electrically adjustable shutter formed from a smectic A (SmA) liquid crystal device. Smectic liquid crystal devices may be characterized by bistable operation, low power consumption, and low off-axis light absorption when transparent. In this type of arrangement, shutter 8 has an upper layer such as ultraviolet light blocking layer 60 (e.g., an ultraviolet filter). Layer 60 may prevent ultraviolet ambient light from damaging materials in shutter 8. Upper electrode 64 may be formed on upper substrate 62 facing liquid crystal layer 66. Lower electrode 68 may be formed on lower substrate 70 facing liquid crystal layer 66. Upper and lower substrates 62 and 70 may be formed from clear materials such as layers of transparent glass or plastic. Upper electrode 64 and lower electrode 68 may be formed from transparent conductive material such as indium tin oxide or other transparent conductive material. Electrodes 64 and 68 may be used to adjust the electric fields applied to liquid crystal layer 66 during operation of electrically adjustable shutter 8 to adjust the appearance of layer 66. Layer 66 may include a mixture of liquid crystal material, ionic dopants, and dye. The dye in layer 66 may be selected so that shutter 8 varies in appearance between black and clear or between other colors, other amounts of light absorption, light transmission, light reflection, and/or color appearance.

When not being actively switched between different optical states (e.g., different amounts of light transmission), smectic liquid crystal shutter 8 does not consume power. When it is desired to change from a first state (e.g., a dark and hazy state) to a second state (e.g., a clear state with a haze of less than 5% or other suitable low-haze value), a brief (e.g., less than a fraction of a second) alternating current signal of greater than about 1 kHz in frequency and a voltage of about +/−100 V or less may be applied to layer 66 with electrodes 64 and 68. When it is desired to revert to the first state from the second state, a brief low-frequency signal (e.g., about 60 Hz) may be applied across electrodes 64 and 68.

Figure 10:
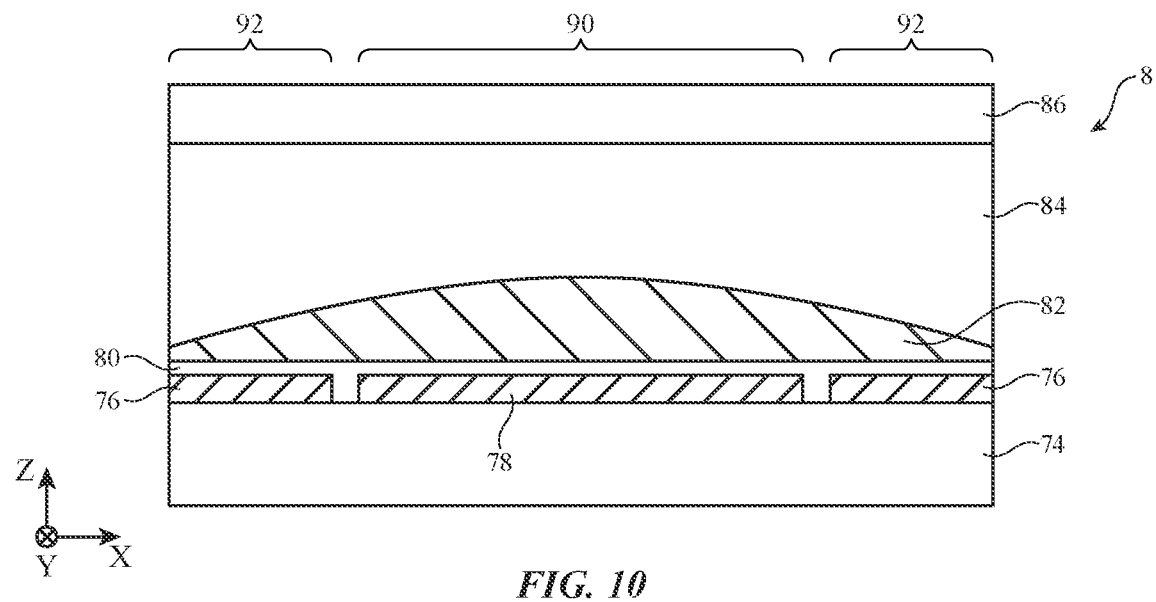
FIG. 10 is a cross-sectional side view of an illustrative adjustable electrowetting shutter in a closed configuration in accordance with an embodiment.
Figure 11:
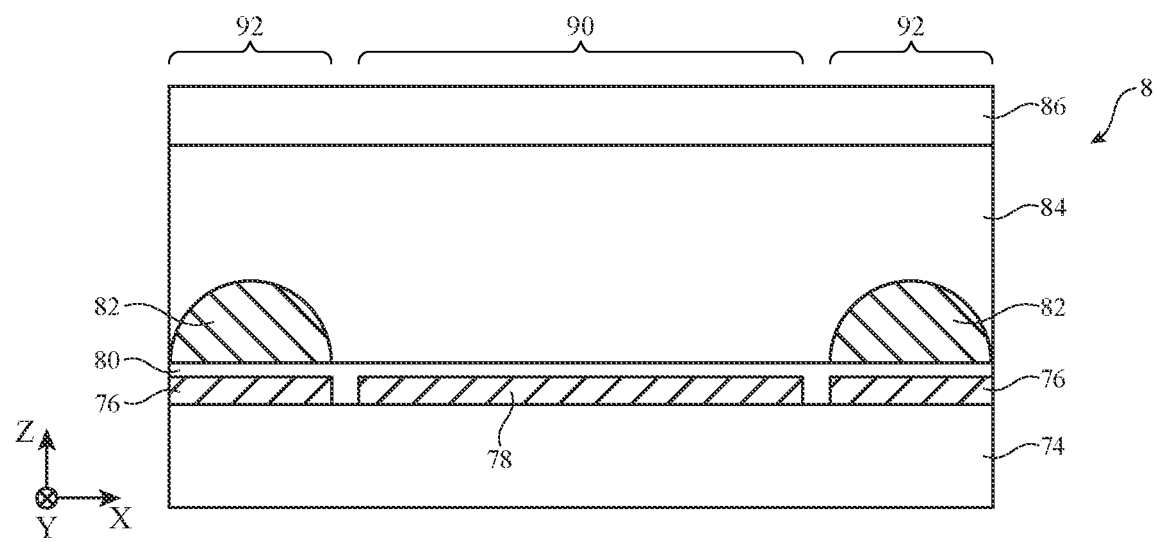
FIG. 11 is a cross-sectional side view of the adjustable electrowetting shutter of FIG. 10 in an open configuration in accordance with an embodiment.
Figure 12:
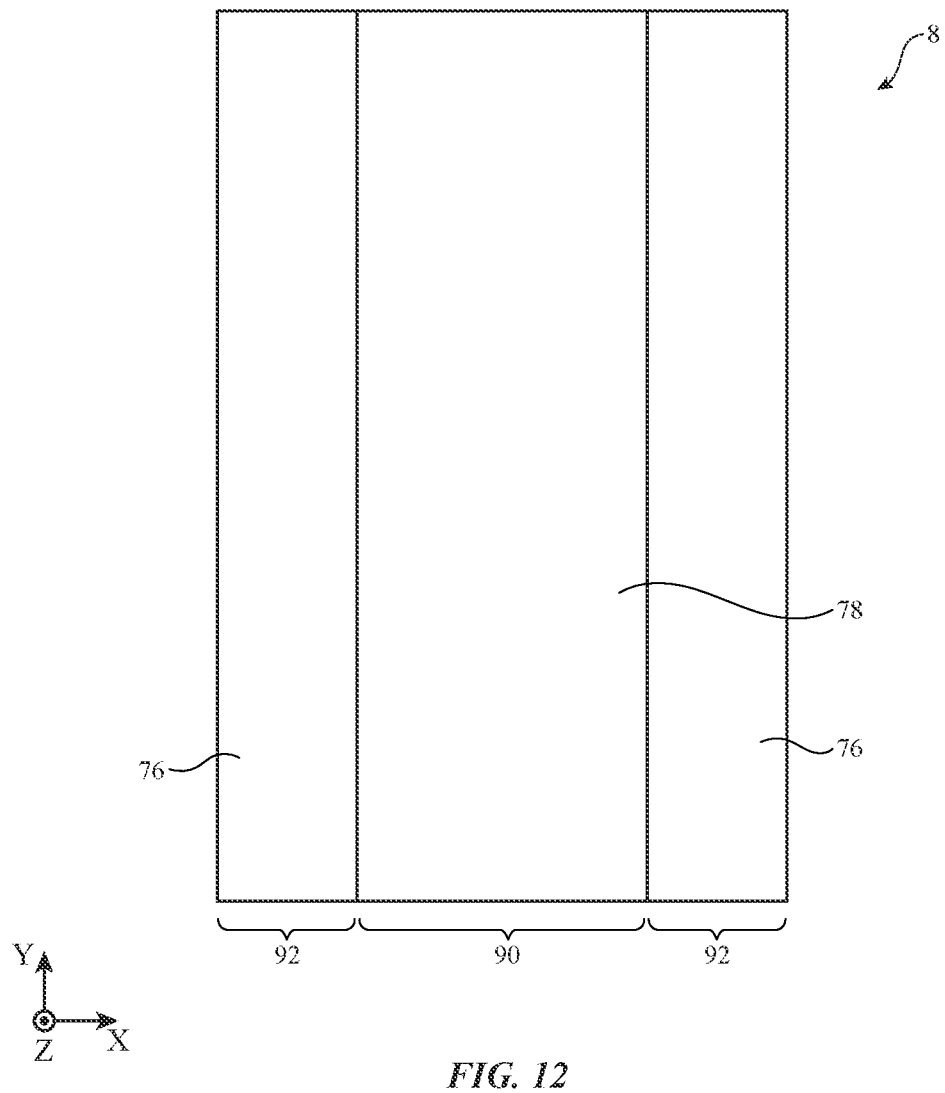
FIG. 12 is a top view of the illustrative electrowetting shutter of FIGS. 10 and 11 in accordance with an embodiment.

FIGS. 10 and 11 are cross-sectional side views of electrically adjustable shutter 8 in an illustrative configuration in which shutter 8 has been formed from an electrowetting device (e.g., an electrowetting-on-dielectric device). As shown in FIG. 10, shutter 8 may have transparent upper substrate 86 and transparent lower substrate 74. Immiscible liquids such as water 84 and oil 82 may be interposed between substrates 86 and 74. On lower substrate 74, outer electrodes 76 and inner electrode 78 are laterally separated by gaps and are therefore electrically isolated from each other. Electrodes 76 and 78 (or, in the illustrative embodiment of FIGS. 10 and 11, at least central electrode 78) may be formed from transparent conductive material such as indium tin oxide or other transparent conductive material. Hydrophobic coating layer 80 is formed over electrodes 76 and 78. Oil 82 (e.g., dark oil) contains dye or other colorant (e.g., to render oil 82 black, other opaque colors, a non-neutral color, or other desired color). When no voltage is present across electrodes 76 and 78, oil 80 spreads across layer 80 and prevents light from passing through central region 90 and peripheral region 92 of shutter 8. When a voltage is applied across electrodes 76 and 78, oil 80 is drawn on top of outer electrode(s) 76. This leaves central region 90 free of oil and renders region 90 transparent (e.g., shutter 8 is in its transparent state), as shown in FIG. 11. A top view of shutter 8 of FIGS. 10 and 11 is shown in FIG. 12 (e.g., in a configuration in which shutter 8 is configured to fit over some or all of an elongated window structure such as window 30 of FIG. 4 or other optical window 30 in device 10).

If desired, other types of electrically adjustable optical shutter device may be used to form shutter 8. For example, guest-host liquid crystal devices may be used in which guest anisotropic dyes of desired colors are incorporated into host liquid crystal material between a pair of transparent electrodes. Another illustrative adjustable device that may be used in forming adjustable shutter 8 is a polymer stabilized cholesteric liquid crystal device, which is hazy when off and clear when on. Polymer dispersed liquid crystal devices, electrophoretic liquid crystal devices, transreflective liquid crystal devices (e.g., devices based on cholesteric liquid crystals), liquid crystal devices with polarizers, electrophoretic devices, microelectromechanical systems devices (devices with microlouvers), electrochromic devices, and/or other devices with adjustable optical properties may be used in forming shutter 8, if desired. The configurations of FIGS. 9, 10, 11, and 12 are merely illustrative.

During operation of device 10, control circuitry 16 may place shutter 8 in an opaque (e.g., non-transparent) state whenever shutter 8 does not need to be transparent to support operation of underlying component 40 of FIG. 5. When component 40 desires to receive or transmit light, control circuitry 16 may adjust shutter 8 to increase the transparency of shutter 8 (e.g., to place shutter 8 in a transparent state). After component 40 has been used, the transparency of shutter 8 may again be reduced so that shutter 8 can block component 40 from view.

In some situations, shutter 8 may exhibit three or more different states (or continuously adjustable behavior). For example, shutter 8 may be placed in a dark state, a clear state, or a reflective state. The reflective state may be used, for example, when it is desired to adjust the cosmetic appearance of device 10 or when it is otherwise desired to render the appearance of component 40 reflective (e.g., when it is desired to use the surface of shutter 8 as a mirror to reflect a user's face or other image). Non-transparent states for shutter 8 may be used to help blend or harmonize the appearance of component 40 and/or window 30 with surrounding portions of device 10.

If desired, shutter 8 may be adjusted to form a variable neutral density filter for a visible image sensor and/or an infrared image sensor or may be adjusted to change the transmission spectrum of shutter 8 and allow shutter 8 to serve as an adjustable spectral filter for component 40. In some situations, a light-emitting diode or laser (e.g., a camera flash diode or laser) may be flashed to create a visible notification for a user (e.g., that an alarm has expired, a message has been received, etc.). If it is desired to dim this flashing behavior, a shutter 8 that overlaps the light-emitting diode or laser may be placed in a partially transparent state.

In some arrangements, shutter 8 may be placed in a transparent state to allow the interior of device 10 (e.g., interior components in an interior region of housing 22 such as integrated circuits, printed circuits, etc.) to be viewed (e.g., for games, educational purposes, failure analysis, or cosmetic considerations). Display 14 may be transparent in some arrangements (e.g., a transparent organic light-emitting diode display, etc.) as described in connection with FIG. 6. Shutter 8 may be used to create a variable opacity backing layer for a transparent display and/or can be used to create a cosmetic cover that overlaps the outer surface of display 14.

Optical data ports (e.g., ports having light-emitting diodes, lasers, or other optical transmitters and having photodetectors to receive data) may have optical windows such as window 30 and these ports may be hidden with shutters 8 when not in use. Shutters such as shutter 8 may also contain conductive material (e.g., carbon particles or other conductive material in oil 82) and may be used in forming an antenna (e.g. an antenna for communications circuitry 20). By varying the shape of oil 82 while adjusting shutter 8, the electromagnetic properties of the antenna can be adjusted (e.g., to tune the antenna to cover desired frequency bands, etc.). Movable electromagnetic interference (EMI) shields may also be created in this way. When shielding is desired, conductive oil in an electrowetting shutter device can be moved into a position in which the conductive oil forms an EMI shield over a sensitive component. When shielding is not needed and/or it is desired to change the appearance of a portion of device 10, the electrowetting shutter device can move the conductive oil to a different location.

To determine whether device 10 has been exposed to environmental contaminants such as moisture, device 10 may be provide with moisture indicators (sometimes referred to as liquid contact indicators). Moisture indicators may be formed from water dot material (e.g., paper infused with dye) or other material that changes appearance (e.g., from white to red, etc.) when exposed to moisture. The moisture indicator may not have an attractive appearance and can therefore be covered with an opaque shutter 8 when not being inspected. When a technician desires to inspect the state of the moisture indicator, shutter 8 may be placed in a transparent state (e.g., so that the moisture indicator that is overlapped by the shutter can be viewed through the shutter). If desired, an electrical moisture detector can detect when moisture is present and, based on this determination, control circuitry 16 can adjust the state of an electrically adjustable shutter (e.g., shutter 8 may serve as a liquid contact indicator).

As described in connection with FIG. 5, component 40 may include unsightly text (country of manufacture, model number information, government agency identification number information, etc.). This information can be hidden from view by shutter 8 during normal operation and revealed on selected occasions.

Components such as light-emitting diodes and/or lasers (see, e.g., light source components 40 of FIGS. 7 and 8) can sometimes be unsightly, so the ability to cosmetically cover these light sources with shutter 8 when not in use may allow components with an unattractive outward appearance but enhanced performance to be used in device 10. Uncovered cameras may give rise to privacy concerns. These concerns can be addressed by placing shutter 8 over a camera (e.g., a visible image sensor) in device 10. This allows the shutter to be closed during operation of device 10 except when the camera is in active use. If desired, shutter 8 may serve as an adjustable neutral density filter or adjustable aperture. In an adjustable aperture arrangement, shutter 8 may have an electrode pattern (e.g., a ring shaped pattern) that allows dark oil 82 or other dark substances to create a circular transparent aperture or other transparent aperture of a desired adjustable diameter. Adjustable apertures may also be created by using ring-shaped electrodes in liquid crystal shutters or other shutters.

The foregoing is merely illustrative and various modifications can be made to the described embodiments. The foregoing embodiments may be implemented individually or in any combination.

What is claimed is:

1. An electronic device having opposing front and rear faces, the electronic device comprising:
 a display forming the front face;
 a housing having a rear housing wall forming the rear face;
 an electrochromic component coupled to the rear housing wall; and
 control circuitry configured to adjust the electrochromic component between a first mode and a second mode.

2. The electronic device defined in claim 1 wherein the control circuitry is configured to adjust the electrochromic component between a first color in the first mode and a second color that is different from the first color in the second mode.

3. The electronic device defined in claim 2 wherein the first color is blue.

4. The electronic device defined in claim 3 wherein the second color is gray.

5. The electronic device defined in claim 2 wherein the first color is selected from the group of colors consisting of: blue, red, green, blue-black, white, black, and gray.

6. The electronic device defined in claim 1 wherein the control circuitry is configured to adjust the electrochromic component between exhibiting a first haze in the first mode and a second haze that is different from the first haze in the second mode.

7. The electronic device defined in claim 1 wherein the electrochromic component comprises first and second electrodes and wherein the control circuitry is configured to adjust the electrochromic component between the first and second modes by applying a voltage to the first and second electrodes.

8. The electronic device defined in claim 7 wherein the first and second electrodes are respectively formed on first and second glass substrates.

9. The electronic device defined in claim 1 wherein the electrochromic component is adjustable between at least one additional mode.

10. The electronic device defined in claim 1 wherein the electrochromic component is configured not to draw power when in the first mode or the second mode.

11. The electronic device defined in claim 10 wherein the electrochromic component is continuously adjustable between the first mode and the second mode.

12. The electronic device defined in claim 1 wherein the rear housing wall is formed from a planar glass member.

13. The electronic device defined in claim 12 further comprising:
a camera that receives light through the rear housing wall.

14. An electronic device having a front and a rear, the electronic device comprising:
a display facing the front;
a transparent member at the rear;
an electrochromic component positioned behind the transparent member;
control circuitry that is configured to adjust the electrochromic component between exhibiting a first color and a second color that is different from the first color; and
a camera that receives light through the transparent member.

15. The electronic device defined in claim 14 wherein the first color is a neutral color and the second color is a non-neutral color.

16. The electronic device defined in claim 15 wherein the first color is gray and the second color is blue.

17. The electronic device defined in claim 16 wherein the electrochromic component comprises first and second electrodes and wherein the control circuitry is configured to apply a voltage to the first and second electrodes to adjust the color of the electrochromic component.

18. The electronic device defined in claim 17 wherein the transparent member is a rear housing wall.

19. An electronic device having first and second sides, the electronic device comprising:
a display facing the first side;
an electrochromic component visible at the second side and adjustable between exhibiting a first color and a second color that is different from the first color; and
a sensor interposed between the display and the electrochromic component.

20. The electronic device defined in claim 19 further comprising:
a housing, wherein the electrochromic component is configured to be adjusted based on a user's interaction with the housing.

* * * * *